United States Patent [19]

Numa

[11] Patent Number: 4,732,941

[45] Date of Patent: Mar. 22, 1988

[54] PROCESS FOR PREPARING A STABLE DISPERSION OF VINYL POLYMER

[75] Inventor: Nobushige Numa, Ebina, Japan

[73] Assignee: Kansai Paint Company, Limited, Amagasaki, Japan

[21] Appl. No.: 879,781

[22] Filed: Jun. 27, 1986

[30] Foreign Application Priority Data

Jul. 5, 1985 [JP] Japan .............................. 60-148821
Jul. 24, 1985 [JP] Japan .............................. 60-163293

[51] Int. Cl.⁴ .......................................... C08F 259/00
[52] U.S. Cl. .................... 525/276; 524/239; 526/203
[58] Field of Search ........................ 525/276; 524/239; 526/203

[56] References Cited

U.S. PATENT DOCUMENTS

| | | | |
|---|---|---|---|
| 2,828,274 | 3/1958 | Lo | 525/276 |
| 3,397,166 | 8/1968 | Schmidle et al. | 525/276 |
| 4,100,225 | 7/1978 | Mueller | 525/276 |
| 4,391,940 | 7/1983 | Kuhls et al. | 525/276 |
| 4,564,561 | 1/1986 | Lore et al. | 525/276 |

FOREIGN PATENT DOCUMENTS

| | | | |
|---|---|---|---|
| 53-26781 | 3/1978 | Japan | 525/276 |
| 54-56671 | 5/1979 | Japan | 525/276 |
| 59-41315 | 3/1984 | Japan | 525/276 |
| 60-184513 | 9/1985 | Japan | 525/276 |
| 61-14267 | 1/1986 | Japan | 525/276 |

*Primary Examiner*—Joseph L. Schofer
*Assistant Examiner*—N. Sarofim
*Attorney, Agent, or Firm*—Armstrong, Nikaido, Marmelstein & Kubovcik

[57] ABSTRACT

This invention provides a process for preparing a stable dispersion of vinyl polymer, the process comprising polymerizing at least one monomer polymerizable in radical polymerization in an organic liquid in which the monomer is soluble and in which the polymer produced from the monomer is insoluble and in the presence of a dispersion stabilizer comprising at least one polymer selected from the group consisting of:

(A) at least one polymer selected from the polymers of acrylic or methacrylic monomer containing perfluoroalkyl group and represented by the formula

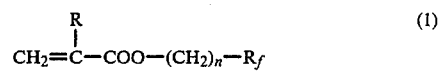

wherein R is hydrogen or methyl, n is an integer of 1 to 11, and $R_f$ is straight chain or branched chain perfluoroalkyl group having 1 to 21 carbon atoms, (B) at least one copolymer containing as a copolymerizing component about 1% or more by weight of the perfluoroalkyl-containing acrylic or methacrylic monomer of the formula (1), and (C) at least one polymer which essentially contains fluoroolefin, is soluble in an organic solvent and has a weight-average molecular weight of about 5,000 to about 120,000 and a fluorine content of about 1 to about 60% by weight.

8 Claims, No Drawings

PROCESS FOR PREPARING A STABLE DISPERSION OF VINYL POLYMER

This invention relates to a process for preparing a stable dispersion of vinyl polymer.

Generally fluorine-containing polymers have properties of giving coats which have small intermolecular force, low refractive index, and high weatherability, water repellency, oil repellency, anti-stick quality, stain resistance and chemical stability, as compared with those formed from other organic polymers. Of such fluorine-containing polymers with the excellent properties for use, those soluble in organic solvents at room temperature possess further features of permitting easy application of coat with high efficiency. The fluorine-containing polymers with these characteristics are synthesized usually by solution polymerization method. When the method employs fluorine-containing monomers in an amount sufficient to produce polymers capable of fully exhibiting these properties, the polymer obtained tends to form coats lower in other properties such as resistance to heat softening, adhesion to the substrate, hardness, impact resistance and like thermal and mechanical properties. More specifically, fluorine-containing polymers synthesized by solution polymerization method entail difficulties in producing coats which have both the properties attributable to fluorine atom and those essentially required of coats. Further fluorine-containing monomers are far more expensive than polymerizable vinyl monomers commonly used. Accordingly, it is thought important to achieve the intended result by using a minimum amount of fluorine-containing monomers.

It is an object of this invention to provide a vinyl polymer capable of giving coats which have the properties due to fluorine atom as well as those essentially required of coats.

It is another object of the invention to provide a vinyl polymer capable of producing coats which are small in intermolecular force, outstanding in chemical stability, anti-stick quality, weatherability, water repellency, oil repellency and stain resistance and low in refractive index.

It is a further object of the invention to provide a vinyl polymer capable of forming coats excellent also in thermal and mechanical properties including heat resistance, adhesion to the substrate, hardness and impact resistance.

It is an additional object of the invention to provide a vinyl polymer capable of producing coats having these characteristics and properties despite the low content of fluorine-containing monomer.

It is a still further object of the invention to provide a stable dispersion of the vinyl polymer.

These and other features of the invention will become more apparent from the following description.

This invention provides a process for preparing a stable dispersion of vinyl polymer, the process comprising polymerizing at least one monomer polymerizable in radical polymerization in an organic liquid in which the monomer is soluble and in which the polymer produced from the monomer is insoluble and in the presence of a dispersion stabilizer comprising at least one polymer selected from the group consisting of:

(A) at least one polymer selected from the polymers of acrylic or methacrylic monomer containing perfluoroalkyl group and represented by the formula

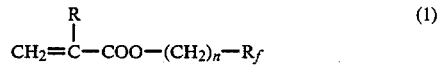

wherein R is hydrogen or methyl, n is an integer of 1 to 11, and $R_f$ is straight chain or branched chain perfluoroalkyl group having 1 to 21 carbon atoms, (B) at least one copolymer containing as a copolymerizing component about 1% or more by weight of the perfluoroalkyl-group-containing acrylic or methacrylic monomer of the formula (1), and (C) at least one polymer which essentially contains fluoroolefin, is soluble in an organic solvent and has a weight-average molecular weight of about 5,000 to about 120,000 and a fluorine content of about 1 to about 60% by weight.

The term "perfluoroalkyl" used herein and in the appended claims refers to a group formed by substituting fluorine atoms for all of the hydrogen atoms in a linear chain or branched chain hydrocarbon group.

According to this invention, at least one polymer selected from the polymers described above in (A), (B) and (C) is used as a dispersion stabilizer. The use of the dispersion stabilizer according to the invention results, by the following reason, in a dispersion of polymer capable of giving coats with the properties attributable to fluorine atom and those essentially required of coats. The continuous phase of coat formed from the dispersion of the invention is composed chiefly of the dispersion stabilizer (i.e. polymer formed of fluorine-containing monomer). Thus the surface of the coat mainly exhibits the properties due to fluorine atom, such as excellent weatherability, water repellency, oil repellency and stain resistance, non-adherence and low refractive index. Moreover, the polymer particles of the dispersion serve to enhance the thermal and mechanical properties required of coats. In addition, since the fluorine atom has only to be present in the continuous phase (dispersion stabilizer), and need not be contained in the interior of polymer particles in the dispersion, the dispersion of the invention can display the properties due to fluorine atom which are comparable with those attainable by the conventional solution of fluorine-containing polymer prepared by solution polymerization method even if the dispersion of the invention contains a smaller amount of fluorine-containing monomer than the solution. In brief, the dispersion of the invention has a further advantage of giving coats in a manner significantly favorable in terms of costs.

The dispersion stabilizer to be used in this invention is at least one polymer selected from the polymers stated above in (A) to (C).

The polymer specified above in (A) (hereinafter referred to as "polymer (A)") will be described below.

Useful perfluoroalkyl-group-containing acrylic or methacrylic monomers of the formula (1) can be any of those known in the art, insofar as they are in the range of the formula (1). Of these monomers, it is preferred to use those wherein n is an integer of 1 to 4 and $R_f$ is straight chain or branched chain perfluoroalkyl group having 1 to 10 carbon atoms. Examples of such fluorine monomers are perfluoromethylmethyl acrylate, perfluoromethylmethyl methacrylate, perfluoropropylmethyl acrylate, perfluoropropylmethyl methacrylate, perfluoropropylpropyl acrylate, perfluoropropylpropyl methacrylate, perfluorooctylundecyl acrylate, perfluorooctylundecyl methacrylate, perfluoroisononylmethyl acrylate, perfluoroisononylmethyl methacrylate, 2-perfluorooctylethyl acrylate, 2-perfluorooctylethyl methacrylate, 2-perfluoroisononylethyl acrylate, 2-perfluoroisononylethyl methacrylate, etc. Of these monomers, preferable are perfluoromethylmethyl acrylate, perfluoroisononylmethyl methacrylate, 2-perfluorooctylethyl acrylate, 2-perfluorooctylethyl methacrylate and the like. These monomers are usable singly or at least two of them can be used in mixture.

The polymer (A) can be prepared, for example, by polymerizing the monomer of the formula (1) in the presence of a radical polymerization initiator. Examples of usable radical polymerization initiators are azo initiators such as 2,2'-azobisisobutyronitrile, 2,2'-azobis(2,4-dimethylvaleronitrile) and the like, and peroxide initiators such as benzoyl peroxide, lauryl peroxide, tert-butyl peroctoate and the like. The polymerization initiator is used in an amount of about 0.2 to about 10 parts by weight, preferably about 0.5 to about 5 parts by weight, per 100 parts by weight of the monomers to be polymerized. Polymerization reaction in this invention is preferably conducted in an organic solvent by solution polymerization method. Usable as organic solvents are a variety of those known in the art such as hydrocarbons, fluorine-containing hydrocarbons, alcohols, esters, ketones, glycol ethers, ethers, etc. The solvents are usable singly or at least two of them can be used as mixed in varying proportions. The reaction temperature and reaction pressure can be suitably determined depending on the kind of the polymerization initiator to be used, kind of the solvent to be used and the reaction mode involved. More specifically, the reaction temperature can be suitably selected from the range of about 60° to about 160° C. The reaction can be completed usually in about 1 to about 15 hours. The polymer (A) may be prepared also by polymerizing the monomer of the formula (1) in an aqueous medium, removing the water from the resulting polymer and dissolving the polymer in the organic solvent.

It is suitable that the polymer (A) have a weight-average molecular weight of about 5,000 to about 100,000 (number-average molecular weight of about 1,000 to about 60,000), preferably about 5,000 to about 50,000. The polymer with a molecular weight of less than about 5,000 is likely to result in insufficient stability of the polymer particles in the dispersion and to induce agglomeration and sedimentation, whereas the polymer with a molecular weight of greater than about 100,000 tends to markedly increase the viscosity of the dispersion so that the dispersion may become difficult to handle.

The copolymer stated above in (B) (hereinafter referred to as "polymer (B)") will be discussed below.

The polymer (B) contains as a copolymerizing component at least about 1% by weight, preferably at least 10% by weight, of the monomer of the formula (1).

Examples of monomers copolymerizable with the monomer of the formula (1) are those polymerizable in radical polymerization (hereinafter referred to as "radical-polymerizable monomers"). Exemplary thereof are a wide range of those known in the art and including acrylic or methacrylic monomers such as acrylic acid and methacrylic acid; N,N-dimethylaminoethyl acrylate or methacrylate and N,N-diethylaminoethyl acrylate or methacrylate; $C_{1-18}$ alkyl acrylate or methacrylate, e.g. methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_{2-8}$ hydroxyalkyl acrylate or methacrylate, e.g. hydroxyethyl acrylate, hydroxyethyl methacrylate, hydroxypropyl acrylate and hydroxypropyl methacrylate.

These radical-polymerizable acrylic or methacrylic monomers are usable singly or at least two of them can be used in mixture. When required, the acrylic or methacrylic monomer may be replaced partly or wholly by other radical-polymerizable monomers such as styrene, α-methylstyrene, vinyltoluene and like vinyl aromatic compounds, acrylonitrile, methacrylonitrile, crotonic acid, maleic acid, maleic anhydride, etc.

The polymer (B) can be prepared, for example, by copolymerizing the monomer of the formula (1) with the radical-polymerizable monomer in the presence of a radical polymerization initiator. These monomers are used in such amount that the monomer of the formula (1) accounts for at least about 1% by weight, preferably at least about 10% by weight, of the polymer obtained. The kind and amount of the radical polymerization initiator to be used and other polymerization conditions may be the same as those adopted in preparation of the polymer (A).

It is suitable that the polymer (B) have a weight-average molecular weight of about 5,000 to about 100,000 (number-average molecular weight of about 1,000 to about 60,000), preferably about 5,000 to about 50,000. The polymer with a molecular weight of less than about 5,000 is likely to result in insufficient stability of the polymer particles in the dispersion and to induce agglomeration and sedimentation, whereas the polymer with a molecular weight of greater than about 100,000 tends to significantly increase the viscosity of the dispersion so that the dispersion may become difficult to handle.

The polymer stated above in (C) (hereinafter referred to as "polymer (C)") will be discussed below.

More specifically, the polymer (C) contains fluoroolefin as an essential component and at least one unsaturated monomer as a copolymerizing component selected from the group consisting of alkyl vinyl ether, alicyclic vinyl ether, hydroxy alkyl vinyl ether, hydroxy alicyclic vinyl ether, olefin, haloolefin, unsaturated carboxylic acid, ester thereof and vinyl carboxylate. The polymer (C) has a weight-average molecular weight of about 5,000 to about 120,000 (number-average molecular weight of about 1,000 to about 60,000), preferably about 5,000 to about 50,000 and a fluorine content of about 1 to about 60% by weight, preferably about 10 to about 50% by weight. The polymer (C) is soluble in an organic solvent at room temperature.

Examples of fluoroolefin present as an essential component in the polymer (C) are tetrafluoroethylene, chlorotrifluoroethylene, vinyl fluoride, vinylidene fluoride, etc.

Examples of alkyl vinyl ether to be used as the other copolymerizing component are ethyl vinyl ether, isobutyl vinyl ether, n-butyl vinyl ether and the like; alicyclic vinyl ethers such as cyclohexyl vinyl ether, derivatives thereof and the like; hydroxy alkyl vinyl ethers such as hydroxybutyl vinyl ether and the like; hydroxy alicyclic vinyl ethers such as hydroxy cyclohexyl vinyl ether and the like; olefins and haloolefins such as ethylene, propylene, isobutylene, vinyl chloride, vinylidene chloride and the like; vinyl carboxylates such as vinyl acetate, vinyl n-butyrate and the like; unsaturated carboxylic acids such as acrylic acid, methacrylic acid, crotonic acid and the like, and esters thereof such as $C_{1-18}$ alkyl acrylate or methacrylate, e.g. methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate, lauryl methacrylate and the like, $C_{2-8}$ hydroxyalkyl acrylate or methacrylate, e.g. hydroxyethyl acrylate, hydroxyethyl methacrylate, hydroxypropyl acrylate, hydroxypropyl methacrylate and the like, N,N-dimethylaminoethyl acrylate or methacrylate, N,N-diethylamino acrylate or methacrylate and the like; etc. Of these ethers, preferable are alkyl vinyl ether, alicyclic vinyl ether, hydroxy alkyl vinyl ether, hydroxy alicyclic vinyl ether, olefin and haloolefin. These unsaturated monomers are usable singly or at least two of them can be used in mixture. When required, the monomers may be replaced partly by other radical-polymerizable monomers such as styrene, α-methylstyrene, vinyltoluene and like vinyl aromatic compounds, acrylonitrile, methacrylonitrile, etc.

Also usable are other monomers including the derivatives of the above-exemplified monomers such as carboxyl-group-containing fluoroolefin, glycidyl-group-containing vinyl ether, carboxyl-group-containing vinyl ether and the like.

The polymer (C) with a fluorine content of less than about 1% by weight can not fully exhibit the characteristics, whereas the polymer (C) with a fluorine content of more than about 60% by weight has a reduced solubility in an organic solvent.

The polymer (C) can be prepared, for example, by copolymerizing fluoroolefin with the unsaturated monomer in the presence of a radical polymerization initiator. These monomers are used in such amount that the fluorine atom constitutes about 1 to about 60% by weight of the polymer obtained. The kind and amount of the radical polymerization initiator to be used and other polymerization conditions may be the same as those adopted in preparation of the polymer (A).

It is suitable that the polymer (C) have a weight-average molecular weight of about 5,000 to about 120,000 (number-average molecular weight of about 1,000 to about 60,000). The polymer with a molecular weight of less than about 5,000 is prone to result in insufficient stability of polymer particles in the dispersion and to induce agglomeration and sedimentation, whereas the polymer with a molecular weight of greater than about 120,000 tends to have a reduced solubility in the organic solvent and to significantly increase the viscosity of the dispersion.

Examples of the polymer (C) are hydroxyl-group-containing fluoroolefin-vinyl ether copolymers soluble in organic solvents, such as the "LUMIFLON" series manufactured by Asahi Glass Company Limited, Japan (e.g. "LUMIFLON LF 200" and "LUMIFLON LF 400"). Also commercially available are fluorine-containing organic solvent-soluble polymers manufactured by Daikin Kogyo Co., Ltd., Japan; Central Glass Co., Ltd., Japan and Pennwalt Corp., U.S.A.

The polymers (A), (B) and (C) used as the dispersion stabilizer in the invention preferably have at least one polymerizable double bond in the molecule. The double bond can be introduced, for example, by polymerizing acrylic acid, methacrylic acid or like carboxyl-group-containing monomer as a copolymerizing component and reacting the carboxyl group of the resulting copolymer with glycidyl acrylate, glycidyl methacrylate, allyl glycidyl ether or like unsaturated glycidyl-group-containing monomer. The introduction of the double bond can be also performed by preparing a glycidyl-group-containing copolymer and reacting the glycidyl group of the copolymer with the unsaturated carboxyl-group-containing monomer.

Other combinations are possible, such as those of acid anhydride group with hydroxyl group, those of acid anhydride group with mercaptan group, those of isocyanate group with hydroxyl group, etc. General conditions for the addition reaction between such combinations of reacting groups are well known. Also it goes without saying that the reaction temperature is variable depending on the combination of reacting groups to be selected and the presence of a catalyst.

The reaction gives the polymer (A), (B) or (C) at least 0.1 mole of polymerizable double bond on the average per mole of the polymer.

According to this invention, the polymers (A) to (C) need not invariably be provided with polymerizable double bond. The double bond thus formed produces a covalent bond between the dispersion stabilizer and the polymer forming the particles, thereby achieving more improvements in the storage stability and mechanical stability of the dispersion.

The polymers (A) to (C) are usable singly or at least two of them can be used in mixture among those different in copolymer composition and molecular weight. When required, a small amount of other dispersion stabilizers is conjointly usable such as butyl-etherified melamine-formaldehyde resin, alkyd resin and usual acrylic resins not containing the monomer of the formula (1) as a copolymerizing component.

When the dispersion of this invention is prepared using the polymer (A) or (B) as the dispersion stabilizer, the coat formed from the dispersion is outstanding in stain resistance, mar resistance, water repellency, oil repellency and anti-stick quality due to the low surface tension, low in refractive index, and also excellent in resistance to heat softening, adhesion to the substrate, hardness, impact resistance, tensile strength and like properties. The use of the polymer (C) as the dispersion stabilizer affords a vinyl polymer appreciably high in weatherability, chemical resistance, resistance to heat softening, adhesion to the substrate, hardness, impact resistance, tensile strength and like properties.

In accordance with the invention, the radical-polymerizable monomer or monomers are polymerized in the organic liquid in the presence of the dispersion stabilizer as described hereinbefore.

While the polymer particles of the dispersion produced by polymerization are not substantially dissolved in the organic liquid used in the polymerization, the dispersion stabilizer and the radical-polymerizable monomer are dissolved in the organic liquid acting as a good solvent.

Examples of such organic liquids are aliphatic hydrocarbons such as hexane, heptane, octane and the like; aromatic hydrocarbons such as benzene, toluene, xylene and the like; solvents of the alcohol, ether, ester and ketone types such as isopropyl alcohol, n-butyl alcohol, isobutyl alcohol, octyl alcohol, cellosolve, butyl cellosolve, diethylene glycol monobutyl ether, methyl isobutyl ketone, diisobutyl ketone, ethyl acyl ketone, methyl hexyl ketone, ethyl butyl ketone, ethyl acetate, isobutyl acetate, acyl acetate, 2-ethylhexyl acetate, etc. These organic liquids are usable singly or at least two of them can be used in mixture. Preferred examples thereof are those predominantly containing aliphatic hydrocarbon, suitably combined with aromatic hydrocarbon and solvent of the alcohol, ether, ester or ketone type.

The polymer (A) having a high molecular weight and the polymer (B) having a high molecular weight and containing a large amount of the monomer of the formula (1) may be difficult to dissolve in the foregoing solvent. Thus in such case, the solvent can be replaced, when required, partly or wholly by good solvents such as trichlorotrifluoroethane, metaxylene hexafluoride, tetrachlorohexafluorobutane and the like.

Monomers to be polymerized in the organic liquid in the presence of the dispersion stabilizer are not specifically limited insofar as they are unsaturated radical-polymerizable monomers. Useful monomers include a wide variety of those known in the art. Typical examples are as follows:

(i) acrylate and methacrylate, examples thereof being $C_{1-18}$ alkyl acrylate or methacrylate such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate, lauryl methacrylate and the like; glycidyl acrylate or methacrylate; $C_{2-8}$ alkenyl acrylate or methacrylate such as allyl acrylate or methacrylate and the like; $C_{2-8}$ hydroxyalkyl acrylate or methacrylate such as hydroxyethyl acrylate or methacrylate, hydroxypropyl acrylate or methacrylate and the like; and $C_{3-18}$ alkenyloxyalkyl acrylate or methacrylate such as allyloxyethyl acrylate or methacrylate and the like;

(ii) vinyl aromatic compounds such as styrene, α-methylstyrene, vinyltoluene, p-chlorostyrene, vinylpyridine and the like;

(iii) α,β-ethylenically unsaturated acids such as acrylic acid, methacrylic acid, itaconic acid and the like;

(iv) others including acrylonitrile, methacrylonitrile, methyl isopropenyl ketone, vinyl acetate, Veoba monomer (tradename, product of Shell Chemical Co., Ltd., U.S.), vinyl propionate, vinyl pivalate and the like.

Also usable, of course, are monomers such as those of the formula (1) and/or fluoroolefin for the polymer (C).

The polymerization of the monomer or monomers is carried out using a radical polymerization initiator. Usable radical polymerization initiators include, for example, azo initiators such as 2,2'-azobisisobutyronitrile, 2,2'-azobis(2,4-dimethylvaleronitrile) and the like, the peroxide initiators such as benzoyl peroxide, lauryl peroxide, tert-butyl peroctoate and the like. The polymerization initiator is used in an amount of about 0.2 to about 10 parts by weight, preferably about 0.5 to about 5 parts by weight, per 100 parts by weight of the monomer(s) to be polymerized.

The amount of the dispersion stabilizer can be widely varied depending on its kind, but it is suitable to use the stabilizer in an amount of about 5 to about 80% by weight, preferably about 10 to about 60% by weight, based on the combined amount of the monomer(s) to be polymerized and the stabilizer.

If less than about 5% by weight of the dispersion stabilizer is present, the storage stability of the dispersion is likely to reduce, whereas with over about 80% by weight of the stabilizer present, gellation tends to occur due to the increase of viscosity.

While the total concentration of the monomer(s) and the dispersion stabilizer in the organic liquid is variable as desired according to particular use of the dispersion and is not specifically limited, it is desired that the total concentration thereof be in the range of about 30 to about 70% by weight, preferably about 30 to about 60% by weight.

For the preparation of the dispersion, polymerization can be carried out by conventional methods. The reaction temperature is about 60° to about 160° C. The reaction can be completed usually in about 1 to about 15 hours.

The nonaqueous dispersion of polymer particles prepared by the above-mentioned process of the invention has remarkable stability to dispersion and can be used for preparation of coating compositions, shaped articles, adhesives, fillers and the like.

The dispersion of the invention, although usable as it is, can be admixed, when required, with additives such as a coloring agent, plasticizer, curing agent and the like. Examples of useful coloring agents are dyes, organic pigments, inorganic pigments, metallic pigments, etc. Useful plasticizers include those known in the art such as dimethyl phthalate, dioctyl phthalate and like low molecular-weight plasticizers, vinyl polymer plasticizers, polyester plasticizers and like high molecular-weight plasticizers, etc. These plasticizers can be used as mixed with the dispersion or as dissolved in the radical-polymerizable monomer in preparation of the dispersion so that it will be included in the polymer particles of the dispersion thus prepared. Usable as the curing agent are amino resins, epoxy resins, polyisocyanates and like cross-linking agents The dispersion of the invention can be also blended with cellulose, cellulose derivatives, other acrylic resins, alkyd resins, polyester resins, epoxy resins or the like. The dispersion of the invention can be dried or cured at ambient or elevated temperature.

The invention will be described below in greater detail with reference to Examples and Comparison Examples in which the parts and percentages are all by weight.

EXAMPLE 1

Synthesis of a dispersion stabilizer (I)

| Isobutyl acetate | 40 parts |
|---|---|
| Toluene | 40 parts |

The above-mentioned compounds were refluxed with heating. The following monomers and polymerization initiator were added dropwise thereto over a period of 3 hours. After addition, the mixture was subjected to aging for 2 hours.

| 2-Perfluorooctylethyl methacrylate | 50 parts |
|---|---|
| Styrene | 10 parts |
| Isobutyl methacrylate | 19 parts |
| 2-Ethylhexyl methacrylate | 10 parts |
| 2-Hydroxyethyl methacrylate | 10 parts |
| Methacrylic acid | 1 part |
| 2,2'-Azobisisobutyronitrile | 2 parts |

The acrylic resin varnish thus obtained was found to have 55% nonvolatile content, a viscosity of G (Gardner, 25° C., the same hereinafter) and a weight-average molecular weight of about 16,000.

Synthesis of a polymer dispersion (I)

| Heptane | 93 parts |
|---|---|
| Dispersion stabilizer (I) | 98 parts |

The above substances were placed into a flask and refluxed with heating. The following monomers and polymerization initiator were added dropwise thereto over a period of 3 hours and subjected to aging for 2 hours.

| Styrene | 15 parts |
|---|---|
| Methyl methacrylate | 40 parts |
| Acrylonitrile | 30 parts |
| 2-Hydroxyethyl methacrylate | 15 parts |
| Tert-butylperoxy-2-ethyl hexanoate | 1.5 parts |

The dispersion thus obtained was found to be a stable and low-viscosity polymer dispersion milky in appearance, having 53% nonvolatile content and a viscosity of A and containing polymer particles 0.2 to 0.3 μm in particle size (as measured under an electron microscope, the same hereinafter). The dispersion was left to stand at room temperature for 3 months with the result that no precipitate or coarse particle was found.

The dispersion was applied to a glass plate and dried at room temperature. The dried coat was found to have a surface energy of as low as 14 dyne/cm (as measured by contact angle using water and paraffin, the same hereinafter).

EXAMPLE 2

Synthesis of a dispersion stabilizer (II)

| Isobutyl acetate | 40 parts |
|---|---|
| Toluene | 40 parts |

The above-mentioned compounds were refluxed with heating. The following monomers and polymerization initiator were added dropwise thereto over a period of 3 hours. After addition, the mixture was subjected to aging for 2 hours.

| Perfluoroisononylmethyl methacrylate | 30 parts |
|---|---|
| Styrene | 15 parts |
| Isobutyl methacrylate | 30 parts |
| Lauryl methacrylate | 14 parts |
| 2-Hydroxyethyl methacrylate | 10 parts |
| Methacrylic acid | 1 part |
| 2,2'-Azobisisobutyronitrile | 1.8 parts |

The acrylic resin varnish thus obtained was found to have 55% nonvolatile content, a viscosity of J and a weight-average molecular weight of about 18,000. Synthesis of a polymer dispersion (II)

| Heptane | 82 parts |
|---|---|
| Dispersion stabilizer (II) | 121 parts |

The above substances were placed into a flask and refluxed with heating. The following monomers and polymerization initiator were added dropwise thereto over a period of 3 hours and subjected to aging for 2 hours.

| Styrene | 15 parts |
|---|---|
| Methyl methacrylate | 30 parts |
| Acrylonitrile | 40 parts |
| 2-Hydroxyethyl methacrylate | 15 parts |
| 2,2'-Azobisisobutyronitrile | 2 parts |

The dispersion thus obtained was found to be a stable and low-viscosity polymer dispersion milky in appearance, having 55% nonvolatile content and a viscosity of C and containing polymer particles 0.15 to 0.20 μm in particle size. The dispersion was left to stand at room temperature for 3 months with the result that no precipitate or coarse particle was found.

The dispersion was applied to a glass plate and dried at room temperature. The dried coat was found to have a surface energy of as low as 16 dyne/cm.

EXAMPLE 3

Synthesis of a dispersion stabilizer (III)

| Isobutyl acetate | 40 parts |
|---|---|
| Toluene | 40 parts |

The above-mentioned compounds were refluxed with heating. The following monomers and polymerization initiator were added dropwise thereto over a period of 3 hours. After addition, the mixture was subjected to aging for 2 hours.

| Perfluoromethylmethyl acrylate | 60 parts |
|---|---|
| Styrene | 15 parts |
| Lauryl methacrylate | 14 parts |
| 2-Hydroxyethyl methacrylate | 10 parts |
| Methacrylic acid | 1 part |
| 2,2'-Azobisisobutyronitrile | 1.8 parts |

The acrylic resin varnish thus obtained was found to have 55% nonvolatile content, a viscosity of L and a weight-average molecular weight of about 19,000.

Synthesis of a polymer dispersion (III)

| Heptane | 82 parts |
|---|---|
| Dispersion stabilizer (III) | 121 parts |

The above substances were placed into a flask and refluxed with heating. The following monomers and polymerization initiator were added dropwise thereto over a period of 3 hours and subjected to aging for 2 hours.

| Styrene | 15 parts |
|---|---|
| Methyl methacrylate | 30 parts |
| Acrylonitrile | 40 parts |
| 2-Hydroxyethyl methacrylate | 15 parts |
| 2,2'-Azobisisobutyronitrile | 2 parts |

The dispersion thus obtained was found to be a stable and low-viscosity polymer dispersion milky in appearance, having 55% nonvolatile content and a viscosity of D and containing polymer particles 0.15 to 0.20 μm in particle size. The dispersion was left to stand at room temperature for 3 months with the result that no precipitate or coarse particle was found.

The dispersion was applied to a glass plate and dried at room temperature. The dried coat was found to have a surface energy of as low as 19 dyne/cm.

EXAMPLE 4

Synthesis of a dispersion stabilizer (IV)

Metaxylene hexafluoride (80 parts) was heated and maintained at 110° C. The following monomer and polymerization initiator were added dropwise thereto for a period of 3 hours. After addition, the mixture was subjected to aging for 2 hours.

| 2-Perfluorooctylethyl acrylate | 100 parts |
| --- | --- |
| 2,2'-Azobisisobutyronitrile | 2 parts |

The acrylic resin varnish thus obtained was found to have 55% nonvolatile content, a viscosity of C and a weight-average molecular weight of about 16,000.

Synthesis of a polymer dispersion (IV)

| Cyclohexane | 20 parts |
| --- | --- |
| Metaxylene hexafluoride | 62 parts |
| Dispersion stabilizer (IV) | 121 parts |

The above substances were placed into a flask and refluxed with heating and maintained at 95° C. while the following monomers and polymerization initiator were added dropwise thereto over a period of 3 hours. After addition, the mixture was subjected to aging for 2 hours.

| Styrene | 15 parts |
| --- | --- |
| Methyl methacrylate | 42 parts |
| Acrylonitrile | 20 parts |
| Glycidyl methacrylate | 5 parts |
| Acrylic acid | 3 parts |
| 2-Hydroxyethyl acrylate | 15 parts |
| 2,2'-Azobisisobutyronitrile | 2 parts |

The dispersion thus obtained was found to be a stable and low-viscosity polymer dispersion milky in appearance, having 55% nonvolatile content and a viscosity of B and containing polymer particles 0.18 to 0.20 μm in particle size. The interior of the particles was cross-linked by the reaction between the epoxy group of glycidyl methacrylate and the carboxyl group of acrylic acid. The dispersion was left to stand at room temperature for 3 months with the result that no precipitate or coarse particle was found. The coat formed by applying the dispersion to a glass plate and drying at room temperature was as low as 11 dyne/cm in surface energy.

EXAMPLE 5

Synthesis of a dispersion stabilizer (V)

| Isobutyl acetate | 50 parts |
| --- | --- |
| Toluene | 30 parts |

The above-mentioned compounds were refluxed with heating. The following monomers and polymerization initiator were added dropwise thereto over a period of 3 hours. After addition, the mixture was subjected to aging for 3 hours.

| 2-Perfluorooctylethyl methacrylate | 50 parts |
| --- | --- |
| Styrene | 10 parts |
| Isobutyl methacrylate | 19 parts |
| 2-Ethylhexyl methacrylate | 10 parts |
| 2-Hydroxyethyl methacrylate | 10 parts |
| Methacrylic acid | 1 part |
| Tert-butylperoxy-2-ethyl hexanoate | 3 parts |

The acrylic resin varnish thus obtained was found to have 55% nonvolatile content, a viscosity of H and a weight-average molecular weight of about 16,000. To the whole of the varnish were added the following substances.

| Glycidyl methacrylate | 0.8 part |
| --- | --- |
| 4-Tert-butylpyrocatechol | 0.02 part |
| Dimethylamino ethanol | 0.1 part |

The mixture was subjected to reflux reaction for 5 hours to introduce copolymerizable double bond into the molecular chain of dispersion stabilizer. The amount of double bond thus introduced was about 0.6 mole per mole of the dispersion stabilizer as measured based on the acid number of the resin.

Synthesis of a polymer dispersion (V)

| Heptane | 93 parts |
| --- | --- |
| Dispersion stabilizer (V) | 98 parts |

The above substances were placed into a flask and refluxed with heating. The following monomers and polymerization initiator were added dropwise thereto over a period of 3 hours and subjected to aging for 2 hours.

| Styrene | 10 parts |
| --- | --- |
| Methyl methacrylate | 45 parts |
| Acrylonitrile | 25 parts |
| 2-Perfluorooctylethyl methacrylate | 5 parts |
| 2-Hydroxyethyl methacrylate | 15 parts |
| Tert-butylperoxy-2-ethyl hexanoate | 1.5 parts |

The dispersion thus obtained was found to be a stable and low-viscosity polymer dispersion milky in appearance, having 55% nonvolatile content and a viscosity of H and containing polymer particles 0.2 to 0.3 μm in particle size.

The dispersion was left to stand at room temperature for 3 months with the result that no precipitate or coarse particle was found. The dispersion was applied to a glass plate and dried at room temperature. The dried coat was found to have a surface energy of as low as 13 dyne/cm.

COMPARISON EXAMPLE 1

Synthesis of a dispersion stabilizer (VI)

| Isobutyl acetate | 40 parts |
| --- | --- |
| Toluene | 40 parts |

The above-mentioned compounds were refluxed with heating. The following monomers and polymerization initiator were added dropwise thereto over a period of 3 hours. After addition, the mixture was subjected to aging for 2 hours.

| Styrene | 10 parts |
|---|---|
| Isobutyl methacrylate | 69 parts |
| 2-Ethylhexyl methacrylate | 10 parts |
| 2-Hydroxyethyl methacrylate | 10 parts |
| Methacrylic acid | 1 part |
| 2,2'-Azobisisobutyronitrile | 2 parts |

The acrylic resin varnish thus obtained was found to have 55% nonvolatile content, a viscosity of H and a weight-average molecular weight of about 16,000.

Synthesis of a polymer dispersion (VI)

| Heptane | 93 parts |
|---|---|
| Dispersion stabilizer (VI) | 98 parts |

The above substances were placed into a flask and refluxed with heating. The following monomers and polymerization initiator were added dropwise thereto over a period of 3 hours and subjected to aging for 2 hours.

| Styrene | 15 parts |
|---|---|
| Methyl methacrylate | 40 parts |
| Acrylonitrile | 30 parts |
| 2-Hydroxyethyl methacrylate | 15 parts |
| Tert-butylperoxy-2-ethyl hexanoate | 1.5 parts |

The dispersion thus obtained was found to be a stable and low-viscosity polymer dispersion milky in appearance, having 53% nonvolatile content and a viscosity of B and containing polymer particles 0.2 to 0.3 μm in particle size. The dispersion was left to stand at room temperature for 3 months with the result that no precipitate or coarse particle was found.

The dispersion was applied to a glass plate and dried at room temperature. The dried coat was found to have a surface energy of 35 dyne/cm, namely substantially equal to that of the coat formed from the usual acrylic resin varnish.

COMPARISON EXAMPLE 2

The coat formed from the dispersion stabilizer (IV) on a glass plate was found to have a surface energy of as low as 11 dyne/cm but was adherent.

The coats, meanwhile, produced from the dispersions of the preceding Examples including Example 4 were all tough.

COMPARISON EXAMPLE 3

The coat formed from the dispersion stabilizer (II) on a glass plate had a surface energy of 16 dyne/cm. When compared, the coat of dispersion of Example 2 was similar in surface energy to that of dispersion stabilizer (II) although having only 40% perfluoroalkyl monomer content based on the the coat of stabilizer (II).

EXAMPLE 6

Synthesis of a polymer dispersion (VII)

| Heptane | 102 parts |
|---|---|
| n-Butyl acetate | 8 parts |
| Dispersion stabilizer (VII) ("LUMIFLON LF 200," weight-average molecular weight of about 50,000, 30% fluorine content, hydroxyl number of about 50, 60% nonvolatile content) | 108 parts |

The above substances were placed into a flask and refluxed with heating. The following monomers and polymerization initiator were added dropwise thereto over a period of 3 hours and subjected to aging for 2 hours, followed by addition of 26 parts of n-butyl acetate.

| Styrene | 15 parts |
|---|---|
| Methyl methacrylate | 40 parts |
| Acrylonitrile | 30 parts |
| 2-Hydroxyethyl methacrylate | 15 parts |
| Tert-butylperoxy-2-ethyl hexanoate | 1.5 parts |

The dispersion thus obtained was found to be a stable and low-viscosity polymer dispersion milky in appearance, having 47% nonvolatile content and a viscosity of A and containing polymer particles 0.15 μm in particle size. The dispersion was left to stand at room temperature for 3 months with the result that no precipitate or coarse particle was found.

EXAMPLE 7

Synthesis of a polymer dispersion (VIII)

| Heptane | 102 parts |
|---|---|
| n-Butyl acetate | 8 parts |
| Dispersion stabilizer (chlorotrifluoroethylene/ cyclohexyl vinyl ether/ hydroxybutyl vinyl ether copolymer, 50% fluorine content, hydroxyl number of 60, weight-average molecular weight of about 10,000, 60% nonvolatile content) | 108 parts |

The above substances were placed into a flask and refluxed with heating. The following monomers and polymerization initiator were added dropwise thereto over a period of 3 hours and subjected to aging for 2 hours, followed by addition of 26 parts of n-butyl acetate.

| Styrene | 15 parts |
|---|---|
| Methyl methacrylate | 40 parts |
| Acrylonitrile | 30 parts |
| 2-Hydroxyethyl methacrylate | 15 parts |
| Tert-butylperoxy-2-ethyl hexanoate | 1.5 parts |

The dispersion thus obtained was found to be a stable and low-viscosity polymer dispersion milky in appearance, having 48% nonvolatile content and a viscosity of A3 and containing polymer particles 0.15 μm in particle size. The dispersion was left to stand at room temperature for 3 months with the result that no precipitate or coarse particle was found.

EXAMPLE 8

Synthesis of a polymer dispersion (IX)

| Heptane | 102 parts |
|---|---|
| n-Butyl acetate | 8 parts |

-continued

| Dispersion stabilizer (VII) | 108 parts |

The above substances were placed into a flask and refluxed with heating. The following monomers and polymerization initiator were added dropwise thereto over a period of 3 hours and subjected to aging for 2 hours, followed by addition of 26 parts of n-butyl acetate.

| Styrene | 15 parts |
| Methyl methacrylate | 17 parts |
| Acrylonitrile | 30 parts |
| 2-Hydroxyethyl methacrylate | 15 parts |
| Glycidyl methacrylate | 20 parts |
| Methacrylic acid | 3 parts |
| Tert-butylperoxy-2-ethyl hexanoate | 1.5 parts |

The dispersion thus obtained was found to be a stable and low-viscosity polymer dispersion milky in appearance, having 46% nonvolatile content and a viscosity of B and containing polymer particles 0.12 μm in particle size. The dispersion was left to stand at room temperature for 3 months with the result that no precipitate or coarse particle was found.

EXAMPLE 9

Introduction of double bond into dispersion stabilizer

To 200 parts of "LUMIFLON LF 400" (50% nonvolatile content, acid number of 5, 30% fluorine content, hydroxyl number of about 50, weight-average molecular weight of about 50,000) were added the following substances:

| Glycidyl methacrylate | 0.8 part |
| 4-Tert-butylpyrocatechol | 0.02 part |
| Dimethylamino ethanol | 0.1 part |

The mixture was refluxed for 5 hours to introduce copolymerizable double bond into the molecular chain of dispersion stabilizer.

The reduction in acid number of the resin was subdued to less than 0.02 to introduce up to about 1 mole of the double bond per mole of the dispersion stabilizer.

Synthesis of a polymer dispersion (X)

| Heptane | 80 parts |
| n-Butyl acetate | 8 parts |
| Dispersion stabilizer obtained above | 130 parts |

The above substances were placed into a flask and refluxed with heating. The following monomers and polymerization initiator were added dropwise thereto over a period of 3 hours and subjected to aging for 2 hours, followed by addition of 26 parts of n-butyl acetate.

| Styrene | 15 parts |
| Methyl methacrylate | 40 parts |
| Acrylonitrile | 30 parts |
| 2-Hydroxyethyl methacrylate | 15 parts |
| Tert-butylperoxy-2-ethyl hexanoate | 1.5 parts |

The dispersion thus obtained was found to be a stable and low-viscosity polymer dispersion milky in appearance, having 47% nonvolatile content and a viscosity of D and containing polymer particles 0.18 μm in particle size. The dispersion was left to stand at room temperature for 3 months with the result that no precipitate or coarse particle was found.

EXAMPLE 10

The general procedure of Example 6 was repeated with the exception of using:

| Dispersion stabilizer (II) | 60 parts |
| "LUMIFLON LF 200" | 54 parts |
| Heptane | 96 parts |

The dispersion thus obtained (dispersion XI) was found to be a stable and low-viscosity polymer dispersion milky in appearance, having 47% nonvolatile content and a viscosity of A2 and containing polymer particles 0.2 μm in particle size. The dispersion was left to stand at room temperature for 3 months with the result no precipitate or coarse particle was found.

The dispersion was applied to a glass plate and cured. The cured coat was found to have a surface energy of as low as 21 dyne/cm.

Specimens of clear coating compositions were prepared from the dispersions obtained in Examples and Comparison Examples and from "LUMIFLON LF 200" and the dispersion stabilizers (II), (IV), and (VI), respectively, each using, as a curing agent for the dispersion, polyisocyanate ("CORONATE EH," product of Nippon Polyurethane Co., Ltd., Japan) in an OH/NCO mole ratio of 1:1 and dibutyl tin dilaurate as a curing catalyst in an amount of 0.03 part by weight per 100 parts by weight of resin component. Each of the clear coating composition specimens was applied to a substrate to form a coat 50 μm in thickness when dried, and was cured by standing at room temperature (25° C.) for 7 days. The substrate used was one having a silver metallic coat which was formed by applying "MAGICRON" (tradename for a thermosetting acrylic resin type coating composition manufactured by Kansai Paint Co., Ltd., Japan) to a surface-treated steel plate having an electro-deposit and intercoat produced thereon, and which was finished by baking. The coated substrates were tested for the properties. Tables 1 and 2 show the results.

TABLE 1

| | Specimen | Gloss (60° C.) | Pencil hardness 2 days after curing | Pencil hardness 7 days after curing | Gasoline resistance (rubbed 20 times) | Fluorine-containing monomer content in solids (%)* | Refractive index | Heat softening properties | Adhesion | Tensile strength |
|---|---|---|---|---|---|---|---|---|---|---|
| Ex. | | | | | | | | | | |
| 1 | Dispersion (I) | 93.1 | B | H | Good | 17.5 | 1.40 | HB | 100 | 215 |
| 2 | Dispersion (II) | 95.2 | B | H | Good | 12 | 1.43 | HB | 100 | 220 |
| 3 | Dispersion (III) | 94.6 | HB | H | Good | 24 | 1.40 | H | 100 | 205 |

TABLE 1-continued

| | Specimen | Gloss (60° C.) | Pencil hardness 2 days after curing | Pencil hardness 7 days after curing | Gasoline resistance (rubbed 20 times) | Fluorine-containing monomer content in solids (%)* | Refractive index | Heat softening properties | Adhesion | Tensile strength |
|---|---|---|---|---|---|---|---|---|---|---|
| 4 | Dispersion (IV) | 89.5 | 6B | B | Good | 40 | 1.40 | 2B | 100 | 200 |
| 5 | Dispersion (V) | 93.4 | 2B | H | Good | 20.7 | 1.40 | HB | 100 | 215 |
| Com. Ex. | | | | | | | | | | |
| 1 | Dispersion (VI) | 90.1 | HB | H | Good | 0 | 1.44 | HB | 90 | 240 |
| 2 | Dispersion stabilizer (IV) | 89.2 | 6B | 6B | Dissolved | 100 | 1.39 | <6B | Nonmeasurable | Nonmeasurable |
| 3 | Dispersion stabilizer (II) | 88.1 | 2B | B | Swollen | 30 | 1.42 | 2B | 60 | 160 |

(Note) *excluding polyisocyanate

TABLE 2

| | Specimen | Gloss (60° C.) | Pencil hardness 2 days after curing | Pencil hardness 7 days after curing | Gasoline resistance (rubbed 20 times) | Sunshine weatherometer (3000 hrs) | Gloss retentivity (60° C.) | Fluorine-containing monomer content in solids (%)* | Refractive index | Heat softening properties | Adhesion | Tensile strength |
|---|---|---|---|---|---|---|---|---|---|---|---|---|
| Ex. | | | | | | | | | | | | |
| 6 | Dispersion (VII) | 90.5 | B | H | Good | No crack | Over 90% | 40 | 1.43 | HB | 100 | 305 |
| 7 | Dispersion (VIII) | 90.5 | B | H | Good | No crack | Over 80% | 40 | 1.43 | HB | 100 | 290 |
| 8 | Dispersion (IX) | 90.2 | HB | H | Good | No crack | Over 90% | 40 | 1.43 | HB | 100 | 310 |
| 9 | Dispersion (X) | 97.0 | B | H | Good | No crack | Over 90% | 40 | 1.43 | HB | 100 | 420 |
| 10 | Dispersion (XI) | 90.0 | HB | H | Good | No crack | Over 90% | 40 | 1.43 | HB | 100 | 240 |
| Com. Ex. | | | | | | | | | | | | |
| 1 | Dispersion (VI) | 90.1 | HB | H | Good | No crack | Below 30% | 0 | 1.44 | HB | 90 | 240 |
| | LUMIFLON LF 200 | 89.3 | 6B | B | Slightly swollen | No crack | Over 90% | 100 | 1.42 | 4B | 90 | 170 |
| | Dispersion stabilizer (VI) | 95.4 | HB | H | Good | Cracked | Below 10% | 0 | 1.44 | HB | 95 | 220 |

(Note) *excluding polyisocyanate

In Tables 1 and 2, the following properties were determined by the methods stated below.

Heat sofening properties: The coat was dried for 7 days and heated to 50° C. at which the the pencil hardness was measured.

Adhesion: The coated substrate was cut crosswise to the substrate surface with a cutter knife to form 100 squares, 1 mm×1 mm. An adhesive cellophane tape was adhered to the the coating surface of each test piece and peeled off by a strong pull to count the number of squares with the tape remaining adhered thereto.

Tensile strength: Measured with a stretching instrument (Toyo Measuring Instrument, Tension Model UTM-11) at 20° C. using the coat having a thickness of 50 μm. Elongation rate was 4 mm/min.

What is claimed is:

1. A process for preparing a stable dispersion of vinyl polymer, the process comprizing polymerizing at least one monomer polymerizable in radical polymerization in an organic liquid in which the monomer is soluble and in which the polymer produced from the monomer is insoluble and in the presence of a dispersion stabilizer comprising at least one polymer selected from the group consisting of:

(A) at least one polymer selected from the polymers of acrylic or methacrylic monomer containing perfluoroalkyl group and represented by the formula

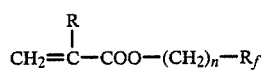

(1)

wherein R is hydrogen or methyl, n is an integer of 1 to 11, and $R_f$ is straight chain or branched chain perfluoroalkyl group having 1 to 21 carbon atoms, (B) at least one copolymer containing as a copolymerizing component about 1% or more by weight of the perfluoroalkyl-containing acrylic or methacrylic monomer of the formula (1), and (C) at least one polymer which essentially contains fluoroolefin, is soluble in an organic solvent and has a weight-average molecular weight of about 5,000 to about 120,000 and a fluorine content of about 1 to about 60% by weight.

2. A process according to claim 1 wherein the perfluoroalkyl-group-containing acrylic or methacrylic monomer of the formula (1) is a monomer in which n is an integer of 1 to 4, $R_f$ is a straight chain or branched chain perfluoroalkyl group having 1 to 10 carbon atoms.

3. A process according to claim 2 wherein the perfluoroalkyl-group-containing acrylic or methacrylic monomer of the formula (1) is at least one monomer selected from the group consisting of perfluoromethylmethyl acrylate, perfluoroisononylmethyl methacrylate, 2-perfluorooctylethyl acrylate and 2-perfluorooctylethyl methacrylate.

4. A process according to any one of claims 1 to 3 wherein the copolymer (B) contains as a copolymerizing component at least about 10% by weight of the perfluoroalkyl-group-containing acrylic or methacrylic monomer of the formula (1).

5. A process according to any one of claims 1 to 3 wherein the fluoroolefin constituting the polymer (C) is at least one species selected from the group consisting of tetrafluoroethylene, chlorotrifluoroethylene, vinyl fluoride and vinylidene fluoride.

6. A process according to claim 5 wherein the other copolymerizing component constituting the copolymer (C) is at least one unsaturated monomer selected from the group consisting of alkyl vinyl ether, alicyclic vinyl ether, hydroxy alkyl vinyl ether, hydroxy alicyclic vinyl ether, olefin, haloolefin, unsaturated carboxylic acid, its ester and vinyl carboxylate.

7. A process according to claim 5 wherein the other copolymerizing component constituting the copolymer (C) is at least one unsaturated monomer selected from the group consisting of alkyl vinyl ether, alicyclic vinyl ether, hydroxy vinyl ether, olefin and haloolefin.

8. A process according to claim 1 wherein the polymer used as a dispersion stabilizer has at least 0.1 mole of polymerizable double bond on the average per mole of the polymer.

* * * * *